May 26, 1931.  J. L. RICHARDSON  1,806,882
CLOTHING COMPARTMENT
Filed June 15, 1929
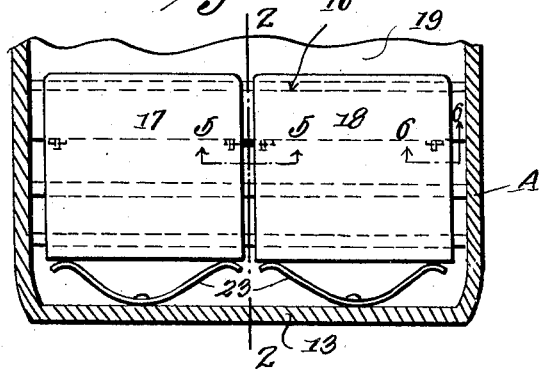
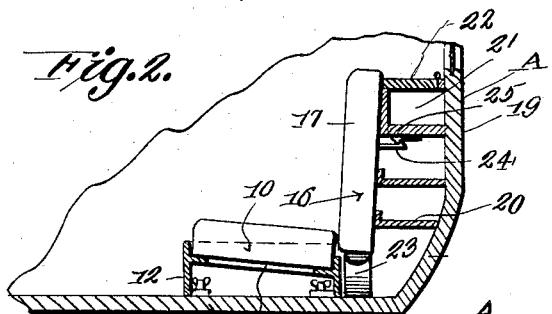
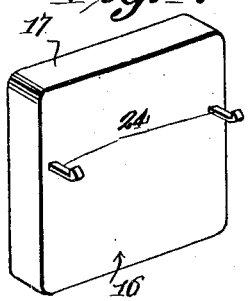
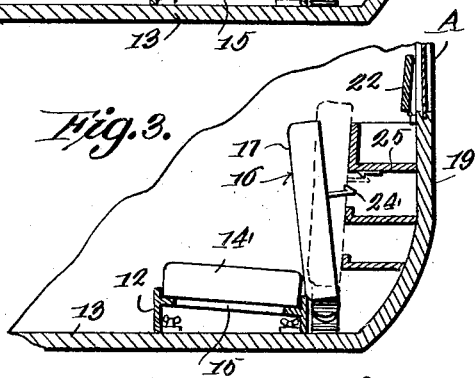
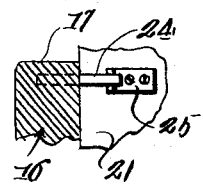
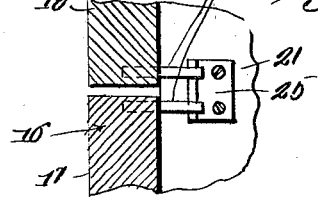
Inventor
JOSEPH L. RICHARDSON
By Irving L. McCathran
Attorney Patented May 26, 1931

1,806,882

UNITED STATES PATENT OFFICE

JOSEPH L. RICHARDSON, OF NASHVILLE, ARKANSAS

CLOTHING COMPARTMENT

Application filed June 15, 1929. Serial No. 371,192.

This invention relates to motor vehicles of the type having removable seat cushions and backs for forming a bed bottom such as is shown in Patent No. 1,715,308, issued to me May 28, 1929.

The primary object of my present invention is the provision of novel means disposed in rear of the removable rear back rest of the vehicle and normally concealed thereby for receiving bed linen and the like.

A further object of my invention is the provision of shelves carried by the rear wall of a motor vehicle on the inside thereof for receiving bed clothes and the like, the forward ends of the shelves forming a rest for the rear back rest of the rear seat, the said back rest normally hiding the shelves from view, means being provided for detachably locking the back rest to the shelves.
A still further object of my invention is the provision of novel means for forming a clothes compartment within a closed car and hiding the compartment from view by the removable back rest of the rear seat.
With these and other objects in view, the invention consists in the novel construction, arrangement and formation of parts, as will be hereinafter more specifically described, claimed, and illustrated in the accompanying drawings, in which drawings:

Figure 1 is a fragmentary transverse section through a vehicle body constructed in accordance with my invention;

Figure 2 is a fragmentary longitudinal section through the same taken on the line 2—2 of Figure 1;

Figure 3 is a view similar to Figure 2 showing the rear back rest being removed;

Figure 4 is a detail perspective view of one of the rear back rests of the rear seat;

Figure 5 is a detail horizontal section taken on the line 5—5 of Figure 1 looking in the direction of the arrows, and Figure 6 is a detail horizontal section taken on the line 6—6 of Figure 1 looking in the direction of the arrows.

Referring to the drawings in detail, wherein similar reference characters designate corresponding parts throughout the several views, the letter A generally indicates a motor vehicle body of the closed type with its seats so arranged as to permit the same to be converted into a bed, as shown in my patent heretobefore mentioned.

In the present application, I have only shown the rear seat 10 and its associate parts in that the present invention appertains more particularly to the novel clothes compartment 11 arranged in rear of the rear seat 10.

The rear seat 10 embodies a relatively short or low built supporting base 12 which is rigidly secured upon the floor 13 of the body A and is of such size as to extend from one side of the same to the other. A seat cushion 14, preferably formed of two sections, is removably supported by the ledges or flanges 15 of the base and is partially housed within the upper end of the base, as clearly shown in Figure 3 of the drawing. The ledges or flanges 15 are arranged rearwardly and downwardly, so that the seat cushion 14 is normally supported in an inclined position for insuring maximum comfort to the persons occupying the seat.

The seat 10 also embodies a removable upholstered back rest, also preferably, but not necessarily, composed of two independent sections 17 and 18. The base 12 is spaced from the rear wall 19 of the body A and consequently the back rest 16 is also spaced from the rear wall. The space between the seat 10 and the rear wall 19 is utilized as a clothes compartment such as for the reception of bed linen, blankets and the like, and this wall 19 and the side walls support a plurality of transversely extending shelves 20 for receiving the bed linen. Likewise the space below the lowermost shelf 20 can also receive bed linen and the like. Above the uppermost shelf I arrange a transversely extending box or casing 21 having a hinged upper cover 22 which can be utilized for the reception of small articles of clothing, or clothing of the character needing special protection.

Directly in front of and below the shelves 20 I arrange a pair of leaf springs 23 which are bolted or otherwise secured to the floor 13 of the body A. A spring 23 is provided for each back section 17 and 18, as clearly shown in Figure 1. These springs 23 normally hold the back rest sections 17 and 18 in a raised position and these sections each carry a pair of rigid latch bars 24 which are adapted to engage keepers 25 secured to the lower wall of the box or casing 21. The springs 23 function to hold the latch bars 24 in engagement with the keepers and thus forward and upward movement of the back rest sections is prevented. It is to be noted that the back rest sections 17 and 18 rest against the front edges of the shelves and the front face of the box or casing 21, and thus the shelves and the box or casing form a support for the back rest and the back rest acts as a closure or front wall for these shelves.

Thus, when the rear back rest 16 is in its normal position, the shelves 20 and the box or casing 21 are completely concealed from view, but when the back rest is removed, the clothes can be readily removed from the shelves. The cushion or back rest sections 17 and 18 can be readily removed by pushing down on the same slightly so as to disengage the latches 24 from the keepers 25, after which the back rest sections can be pulled forwardly and upwardly.

Changes in details may be made without departing from the spirit or the scope of this invention, but:

What I claim as new is:

1. The combination with a motor vehicle body including a rear wall, a clothes compartment carried by the rear wall and a plurality of clothes receiving shelves carried by said wall below the compartment, a rear seat frame spaced from the rear wall, a cushion for the frame, a removable back rest for the frame, companion latch members carried respectively by the back rest and clothes compartment, and resilient means carried by the body intermediate the rear wall and seat frame for normally holding the back rest in a raised position and the companion latch members in locked engagement the back rest normally resting against the forward edge of said shelves.

2. The combination with a motor vehicle body including a rear wall, a clothes compartment carried by the rear wall and a plurality of clothes receiving shelves carried by said rear wall below the compartment, the front faces of the shelves and compartment all terminating substantially in the same vertical plane, a rear seat base, a cushion for the base, a removable back rest for the base adapted to normally rest against the shelves and compartment, the shelves and compartment acting as a support for the same, and the back rest normally concealing the shelves and compartment from view, companion latch members carried respectively by the back rest and compartment, and leaf springs secured intermediate their ends to the body intermediate the rear wall and the seat base having the terminals thereof engaging the back rest for normally holding the back rest in a raised position and the companion latch members in interengagement.

In testimony whereof I affix my signature.

JOSEPH L. RICHARDSON.